United States Patent
Yang et al.

(10) Patent No.: US 9,104,385 B2
(45) Date of Patent: Aug. 11, 2015

(54) EXPANSION CARD

(75) Inventors: Chen-Han Yang, Taipei (TW);
Chih-Kuan Liu, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 279 days.

(21) Appl. No.: 13/478,124

(22) Filed: May 23, 2012

(65) Prior Publication Data
US 2012/0300386 A1    Nov. 29, 2012

Related U.S. Application Data

(60) Provisional application No. 61/490,596, filed on May 27, 2011.

(51) Int. Cl.
*G06F 1/18* (2006.01)
*G06F 1/20* (2006.01)

(52) U.S. Cl.
CPC .. *G06F 1/185* (2013.01); *G06F 1/20* (2013.01)

(58) Field of Classification Search
CPC ............... G06F 1/185; H05K 7/20445; H05K 7/20409; H05K 7/20418; H05K 7/2049; H05K 7/20; H05K 7/20436; H05K 7/20463; H05K 2201/10159; H05K 5/0213; H05K 7/20454; H05K 7/209; H05K 13/00; H05K 1/141; H05K 1/147; H05K 1/189; H05K 2201/043; H05K 2201/056; H05K 2201/09109; H05K 2201/1056; H05K 3/0061; H05K 5/0221
USPC .................. 361/679.32, 714, 679.46–679.54; 174/548
See application file for complete search history.

(56) References Cited

U.S. PATENT DOCUMENTS

| | | | |
|---|---|---|---|
| 4,091,440 A | 5/1978 | Gelin et al. | |
| 4,466,049 A | 8/1984 | Chaney et al. | |
| 5,216,578 A | 6/1993 | Zenitani et al. | |
| 5,317,483 A | 5/1994 | Swindler | |
| 6,449,163 B1* | 9/2002 | Stark et al. | 361/752 |
| 6,711,013 B2* | 3/2004 | Wobig et al. | 361/679.47 |
| 6,972,370 B2* | 12/2005 | Wang et al. | 174/535 |
| 7,480,147 B2* | 1/2009 | Hoss et al. | 361/721 |
| 7,580,259 B2* | 8/2009 | Hsiao | 361/695 |
| 7,679,913 B2* | 3/2010 | Hsieh | 361/704 |
| 8,031,465 B2* | 10/2011 | Chen et al. | 361/679.54 |
| 2001/0019913 A1* | 9/2001 | Llapitan et al. | 439/327 |
| 2005/0135055 A1* | 6/2005 | Wang et al. | 361/684 |
| 2008/0089034 A1* | 4/2008 | Hoss et al. | 361/721 |
| 2009/0194260 A1* | 8/2009 | Liao et al. | 165/104.33 |

FOREIGN PATENT DOCUMENTS

| TW | M363613 | 8/2009 |
|---|---|---|
| TW | 201005473 | 2/2010 |

* cited by examiner

*Primary Examiner* — David M Sinclair
*Assistant Examiner* — Robert Brown
(74) *Attorney, Agent, or Firm* — Jianq Chyun IP Office

(57) ABSTRACT

The invention provides an expansion card adapted for a motherboard, in which the motherboard includes a first slot, and the first slot is located at a surface of the motherboard. The expansion card includes a circuit board, a heat-dissipating module and a supporter. The circuit board includes a connecting interface configured for being inserted into the first slot of the motherboard. The heat-dissipating module is disposed at a side of the circuit board and has a bottom surface. When the expansion card is inserted into the first slot, the supporter is disposed at the bottom surface of the heat-dissipating module so that the bottom surface of the heat-dissipating module is substantially parallel to the surface of the motherboard.

10 Claims, 7 Drawing Sheets

EXPANSION CARD

CROSS-REFERENCE TO RELATED APPLICATION

This application claims the priority benefits of U.S. provisional application Ser. No. 61/490,596, filed on May 27, 2011. The entirety of the above-mentioned patent applications is hereby incorporated by reference herein and made a part of this specification.

BACKGROUND OF THE INVENTION

1. Field of the Invention

The invention generally relates to an expansion card, and more particularly, to an expansion card of a motherboard.

2. Description of Related Art

In the electronic science and technology society today, due to the emergence of computers, the human lifestyles and way of life have been substantially changed, and in the most people live and work, the computer has gradually become an indispensable tool. In terms of servers and desktop computers, they mainly include host computer, display and computer peripherals. The host computer herein includes computer chassis, motherboard, central processing unit (CPU), memory, hard drive and CD storage device. However, in order to enhance the performance of the host computer, such as image processing, audio processing, and external peripheral functions, usually there are many slots disposed on the motherboard of the host computer for additionally adding graphics card, sound card and other expansion cards.

FIG. 1A is a side-view schematic diagram of a conventional expansion card disposed on the motherboard. FIG. 1B is a three-dimensional schematic diagram of the expansion card in FIG. 1A disposed on the motherboard. Referring to FIGS. 1A and 1B, a motherboard 10 has a first slot 12 and a second slot 14. An expansion card 100 includes a circuit board 110 and a heat-dissipating module 120. Due to the expansion card 100 operation, the electronic components or the chips on the circuit board 110 would produce heat so as to gradually rise the ambient temperature. A high temperature environment may cause the circuit board 110 not working properly, so that the heat-dissipating module 120 is employed to cool the electronic components or the chips on the circuit board 110.

The heat dissipating module 120 can be fixed at a side of the circuit board 110 in screw fastening way or clamping way. The heat dissipating module 120 includes two fans 124 and a plurality of heat-dissipating fins 126, in which the heat-dissipating fins 126 contact the electronic components or the chips on the circuit board 110 to conduct the heat of the circuit board 110 to the heat dissipating module 120, followed by using the fans 124 to bring away the heat on the heat-dissipating fins 126 in convection way so as to cool the expansion card 100.

The circuit board 110 is inserted into the first slot 12 of the motherboard 10. Affected by the weight of the heat dissipating module 120, a bottom surface 122 of the heat dissipating module 120 would gradually get inclination until leaning against the other portions of the motherboard 10, for example, leaning against the second slot 14 on the motherboard 10. At the time, the circuit board 110 may get bending deformation.

SUMMARY OF THE INVENTION

Accordingly, the invention is directed to an expansion card able to avoid the circuit board of the expansion card from bending due to a pulling action by the weight of the heat-dissipating module.

The invention provides an expansion card adapted for a motherboard, in which the motherboard includes a first slot, and the first slot is located at a surface of the motherboard. The expansion card includes a circuit board, a heat-dissipating module and a supporter. The circuit board includes a connecting interface configured for being inserted into the first slot of the motherboard. The heat-dissipating module is disposed at a side of the circuit board and has a bottom surface. When the connecting interface of the expansion card is inserted into the first slot, the supporter is disposed at the bottom surface of the heat-dissipating module so that the bottom surface of the heat-dissipating module is substantially parallel to the surface of the motherboard.

In an embodiment of the disclosure, the above-mentioned motherboard further includes a second slot and when the connecting interface is inserted into the first slot, the heat-dissipating module covers the second slot.

In an embodiment of the disclosure, when the above-mentioned connecting interface is inserted into the first slot, a first surface of the supporter leans against the bottom surface of the heat-dissipating module and a second surface of the supporter leans against the second slot.

In an embodiment of the disclosure, the length and the width of the second surface of the supporter are respectively equal to or less than the length and the width of the second slot.

In an embodiment of the disclosure, when the above-mentioned connecting interface is inserted into the first slot, the first surface of the supporter leans against the bottom surface of the heat-dissipating module and the second surface of the supporter leans against the surface of the motherboard.

In an embodiment of the disclosure, the above-mentioned expansion card is a graphics card and both the first slot and the second slot are peripheral component interconnect express slots (PCI-E slots).

The invention further provides an expansion card adapted for a motherboard, in which the motherboard includes a first slot and a second slot, the first slot and the second slot are located at a surface of the motherboard and the expansion card includes a circuit board, a heat-dissipating module and a supporter. The circuit board includes a connecting interface configured for being inserted into the first slot of the motherboard. The heat-dissipating module is disposed at a side of the circuit board and has a bottom surface. When the connecting interface of the expansion card is inserted into the first slot, a first surface of the supporter leans against the bottom surface of the heat-dissipating module and a second surface of the supporter leans against the second slot so that the bottom surface of the heat-dissipating module is substantially parallel to the surface of the motherboard.

In an embodiment of the disclosure, the length and the width of the second surface of the supporter are respectively equal to or less than the length and the width of the second slot.

The invention further provides an expansion card adapted for a motherboard, in which the motherboard includes a first slot, the first slot is located at a surface of the motherboard and the expansion card includes a circuit board, a heat-dissipating module and a supporter. The circuit board includes a connecting interface configured for being inserted into the first slot of the motherboard. The heat-dissipating module is disposed at a side of the circuit board and has a bottom surface. When the connecting interface of the expansion card is inserted into the first slot, a first surface of the supporter leans against the bottom surface of the heat-dissipating module and a second surface of the supporter leans against the surface of the motherboard so that the bottom surface of the heat-dissipating module is substantially parallel to the surface of the motherboard.

In an embodiment of the disclosure, the above-mentioned expansion card is a graphics card and the first slot is a peripheral component interconnect express slot (PCI-E slot).

In an embodiment of the disclosure, the material of the above-mentioned supporter is nonconductive material.

In an embodiment of the disclosure, the above-mentioned heat-dissipating module includes a fan.

Based on the description above, through a design of disposing a supporter between the bottom surface of the heat-dissipating module and the motherboard in the expansion card of the invention, the heat-dissipating module is risen up by the supporter so that the bottom surface of the heat-dissipating module is parallel to the surface of the motherboard to avoid the heat-dissipating module from overweight to bend the circuit board.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 2A:
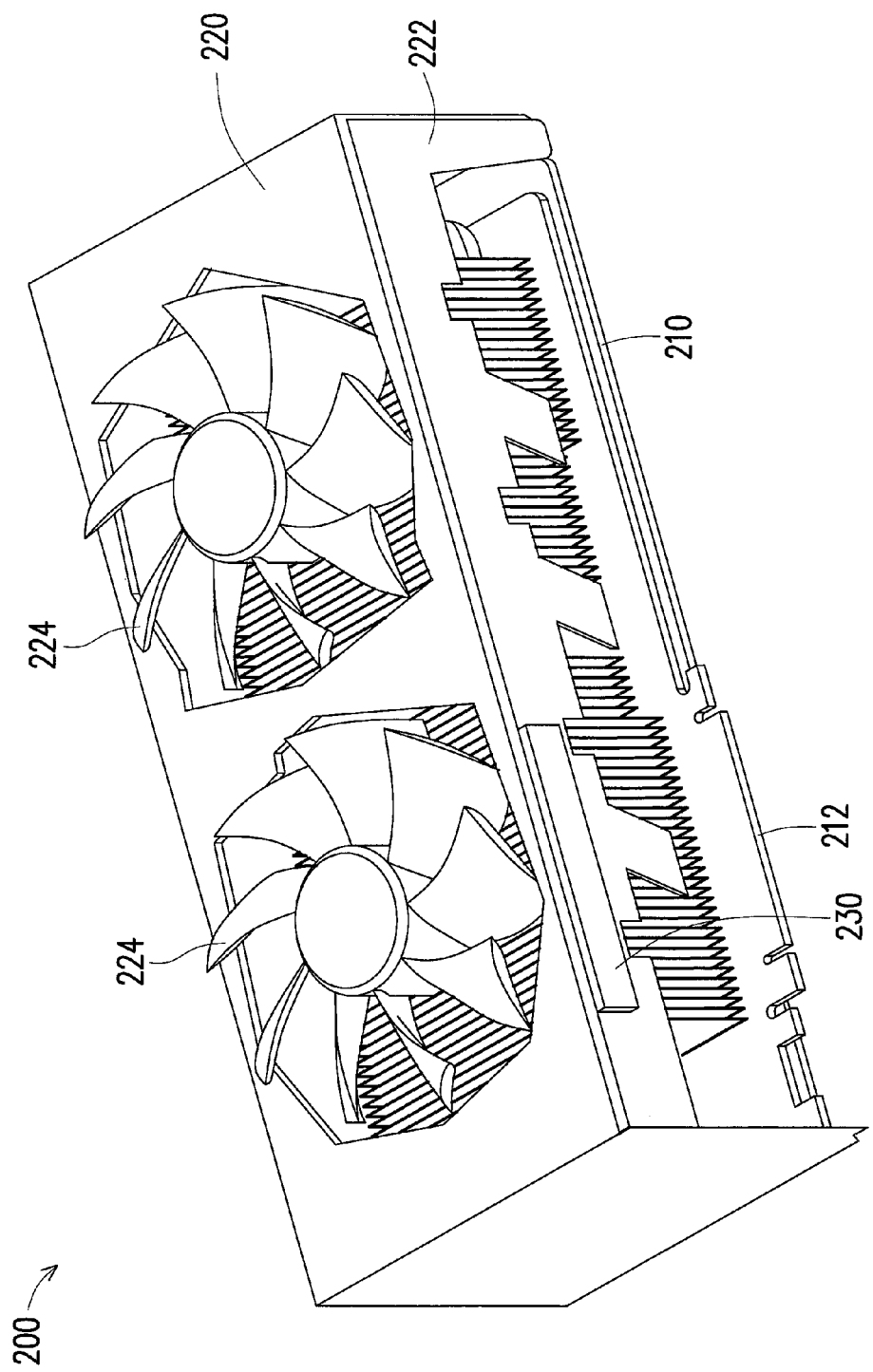
FIG. 2A is a three-dimensional schematic diagram of an expansion card according to an embodiment of the invention.

An expansion card of the invention is adapted for a motherboard. FIG. 2A is a three-dimensional schematic diagram of an expansion card according to an embodiment of the invention. Referring to FIG. 2A, the expansion card 200 of the embodiment includes a circuit board 210, a heat-dissipating module 220 and a supporter 230. The circuit board 210 includes a connecting interface 212. The heat-dissipating module 220 is disposed at a side of the circuit board 210 and has a bottom surface 222. The supporter 230 is disposed at the bottom surface 222 of the heat-dissipating module 220.

Figure 2B:
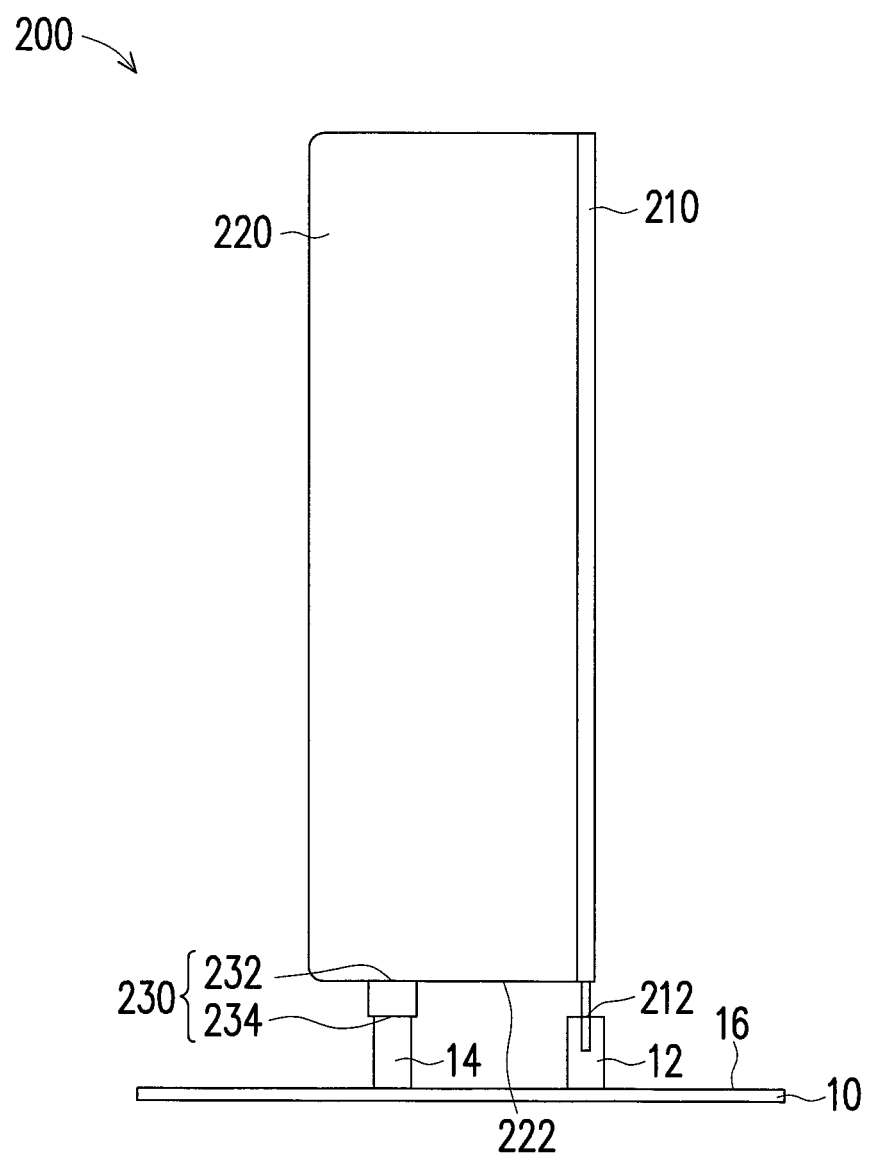
FIG. 2B is a schematic side-view diagram of the expansion card in FIG. 2A disposed on a motherboard.
Figure 2C:
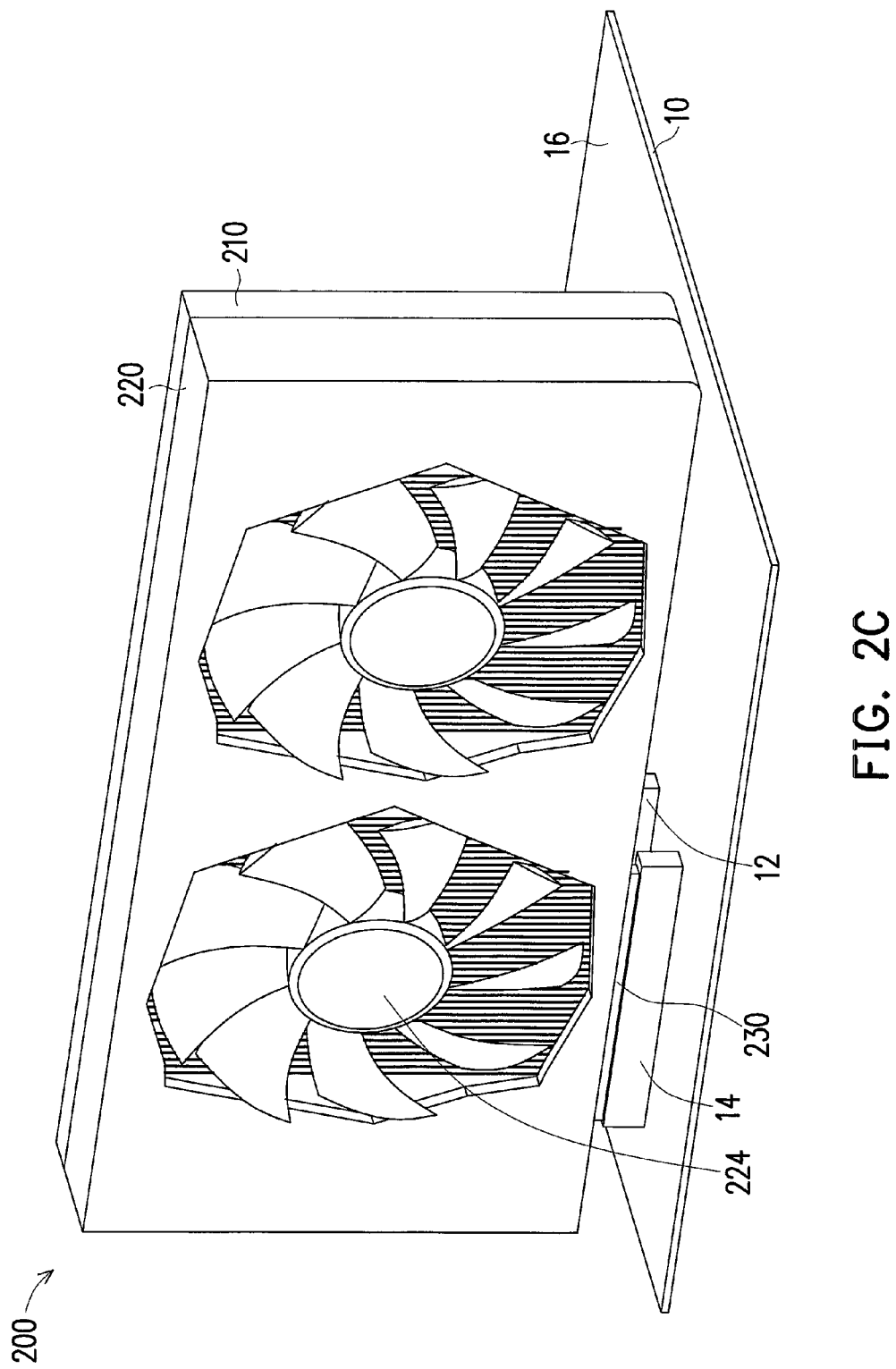
FIG. 2C is a three-dimensional schematic diagram of the expansion card in FIG. 2A disposed on the motherboard.

FIG. 2B is a schematic side-view diagram of the expansion card in FIG. 2A disposed on a motherboard and FIG. 2C is a three-dimensional schematic diagram of the expansion card in FIG. 2A disposed on the motherboard. Referring to FIGS. 2B and 2C, the motherboard 10 includes a first slot 12 and a second slot 14, in which the first slot 12 and the second slot 14 are located at a surface 16 of the motherboard 10. The expansion card 200 can be inserted into the first slot 12 of the motherboard 10 through the connecting interface 212 so that the expansion card 200 is electrically connected to the motherboard 10.

Figure 1A:
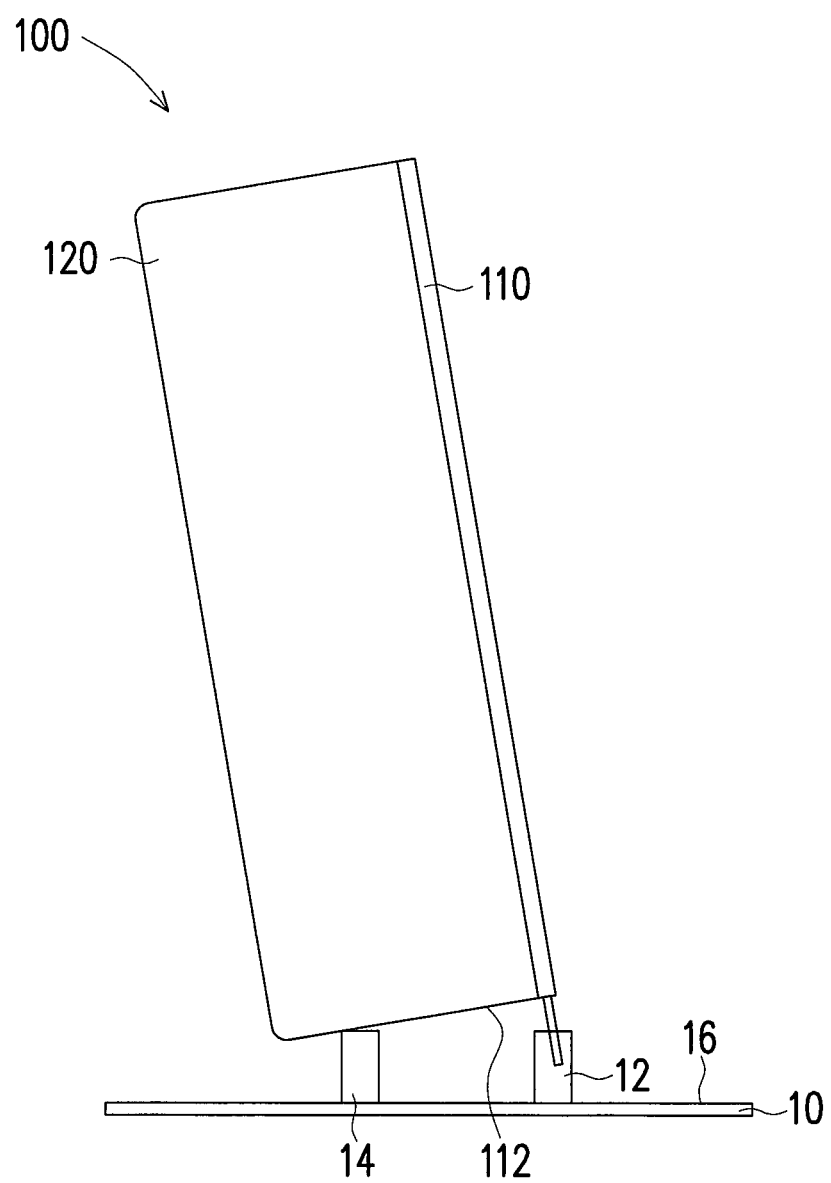
FIG. 1A is a schematic side-view diagram of a conventional expansion card disposed on a motherboard.
Figure 1B:
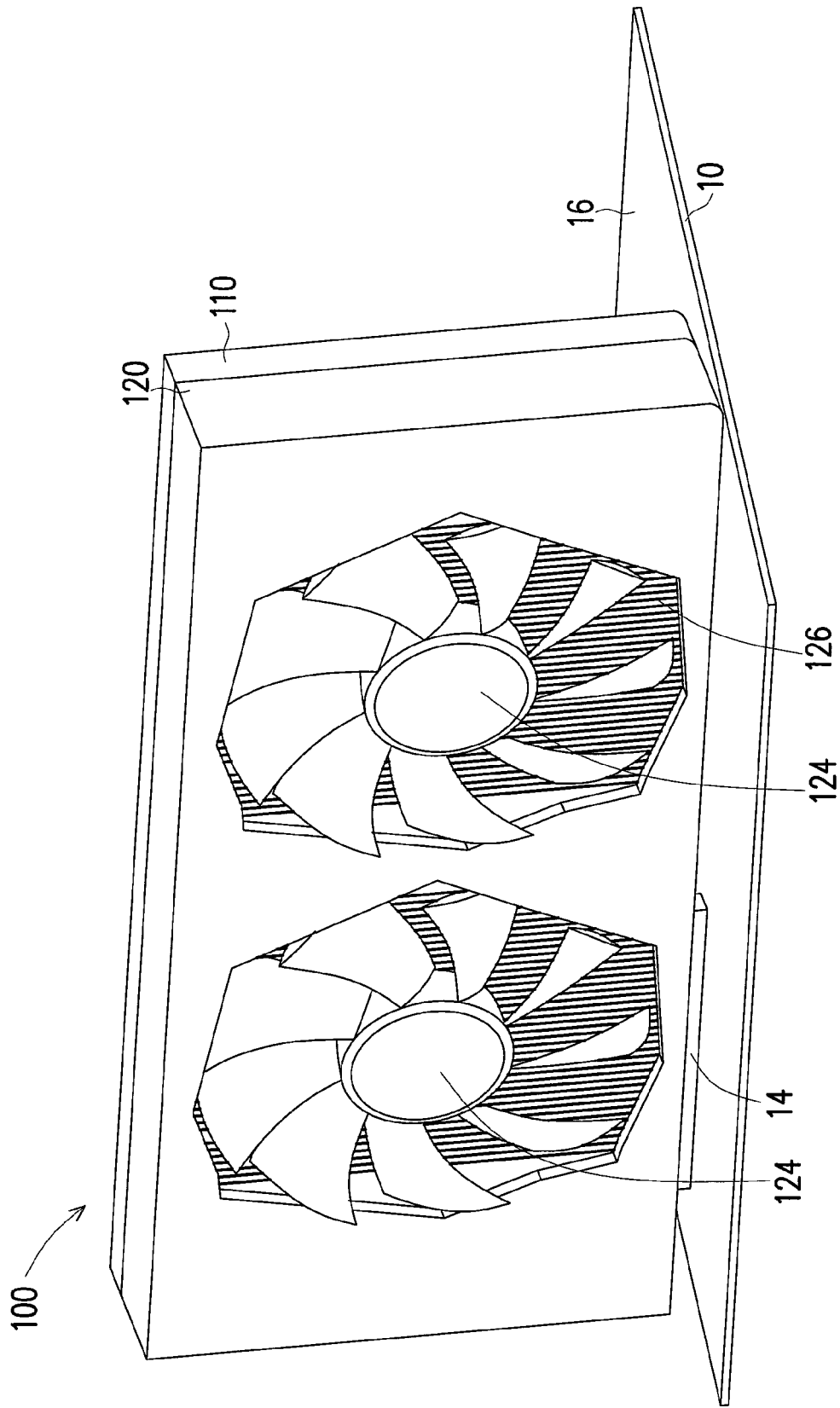
FIG. 1B is a three-dimensional schematic diagram of the expansion card in FIG. 1A disposed on the motherboard.

When the expansion card 200 is inserted into the first slot 12, the volume of the heat-dissipating module 220 at the time has covered the second slot 14 at the upper position of the second slot 14. If the expansion card 200 is inserted into the first slot 12 only through the connecting interface 212 serving also as a support, the weight of the heat-dissipating module 220 would generate a moment relatively to the connecting interface 212 fixed on the second slot 14, which makes the heat-dissipating module 220 get inclination the same as FIG. 1A. In order to avoid the circuit board 210 of the expansion card 200 from bending due to a pulling action by the weight of the heat-dissipating module 220, in the embodiment, a design is provided that the supporter 230 is disposed at the bottom surface 222 of the heat-dissipating module 220. Thus, when the connecting interface 212 of the expansion card 200 is inserted into the first slot 12, the first surface 232 of the supporter 230 leans against the bottom surface 222 of the heat-dissipating module 220 and the second surface 234 of the supporter 230 leans against the second slot 14. At the time, the heat-dissipating module 220 of the expansion card 200 is supported and held by the supporter 230 so that the bottom surface 222 of the heat-dissipating module 220 is substantially parallel to the surface 16 of the motherboard 10.

When the connecting interface 212 is inserted into the first slot 12, if a portion of the supporter 230 is beyond the position of the second slot 14 so as to un-contact the second slot 14, the portion would be in suspended state and unable to provide a support on the heat-dissipating module 220. In this regard, in the design, the projection of the supporter 230 on the surface 16 of the motherboard 10 in the embodiment should be overlapped with the projection of the second slot 14. That is to say, in the embodiment, the aspect dimension (length-width dimension or cross-section dimension) of the second surface 234 of the supporter 230 is the same as or less than the aspect dimension (length-width dimension or cross-section dimension) of the second slot 14 so that the second surface 234 of the supporter 230 can entirely touch onto the second slot 14 to provide the heat-dissipating module 220 with better supportiveness. The dimension of the supporter 230 is certainly not limited by the above-mentioned design.

In addition, when the connecting interface 212 is inserted into the first slot 12, the designer can determine the required thickness of the supporter 230 according to the distance between the bottom surface 222 parallel to the surface 16 and the second slot 14 and the deformation extent of the supporter 230 pressed down by the heat-dissipating module 220 so that the supporter 230 is able to support and hold the bottom surface 222 of the heat-dissipating module 220 to be parallel to the surface 16 of the motherboard 10. The material of the supporter 230 is nonconductive material to avoid the electronic components on the motherboard 10 from being undesired conducted. The material of the supporter 230 can be rubber, which the invention is not limited to.

In the embodiment, the expansion card 200 can be a graphics card and both the first slot 12 and the second slot 14 can be peripheral component interconnect express slots (PCI-E slots). However, the types of the expansion card 200, the first slot 12 and the second slot 14 are not limited by the above-mentioned ones. The heat-dissipating module 220 includes a fan 224, but the invention does not limit the type of the heat-dissipating module 220.

By using the supporter 230 at the bottom surface 222 of the heat-dissipating module 220 in the expansion card 200 to lean against the second slot 14 of the motherboard 10, the bottom surface 222 of the heat-dissipating module 220 is parallel to the surface 16 of the motherboard 10 and the expansion card 200 of the embodiment can avoid the circuit board 210 from bending due to the weight action of the heat-dissipating module 220, which effectively increases the lifetime of the expansion card 200.

Figure 3:
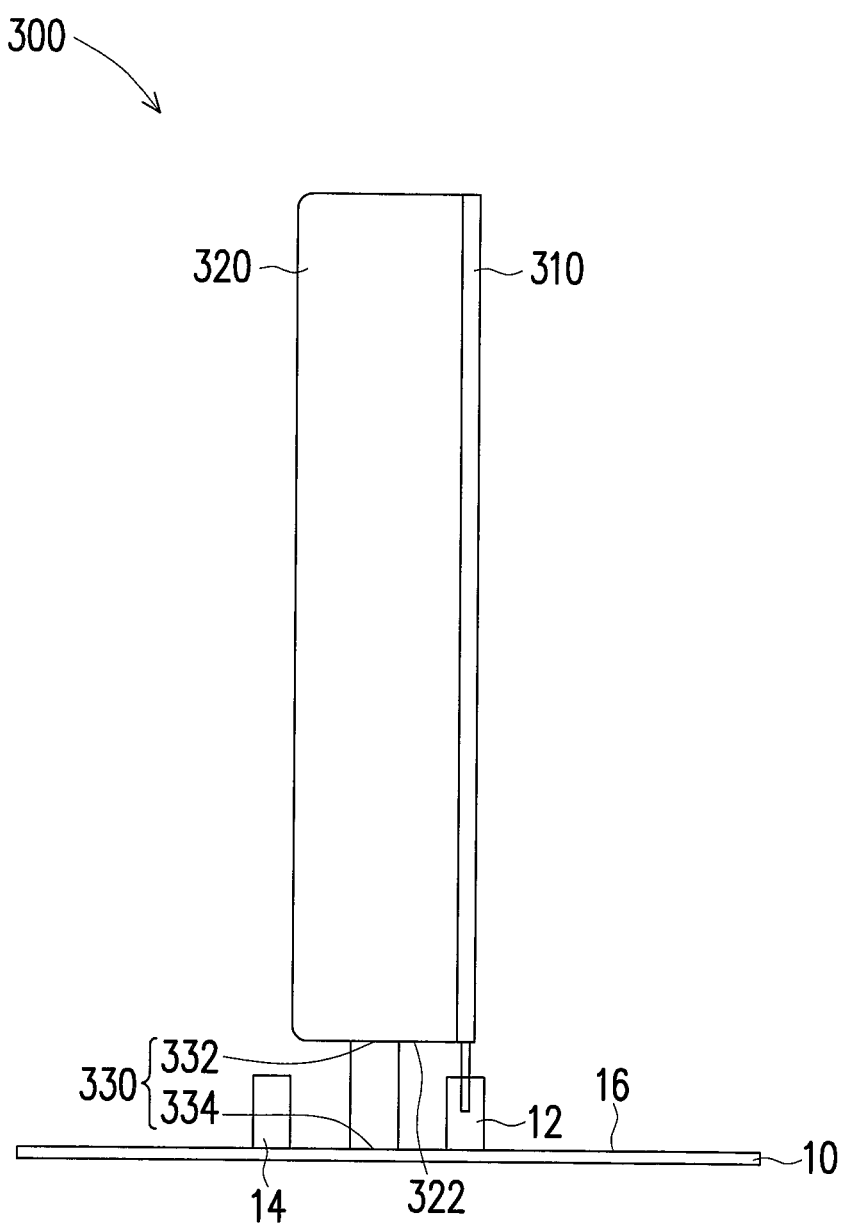
FIG. 3 is a schematic side-view diagram of an expansion card according to another embodiment of the invention.

FIG. 3 is a schematic side-view diagram of an expansion card according to another embodiment of the invention. Referring to FIG. 3, an expansion card 300 of the embodiment is adapted for a motherboard 10, in which the motherboard 10 includes a first slot 12 and the first slot 12 is located at a surface 16 of the motherboard 10. The expansion card 300 includes a circuit board 310, a heat-dissipating module 320 and a supporter 330. The circuit board 310 includes a connecting interface 312 configured for being inserted into the first slot 12 of the motherboard 10. The heat-dissipating module 320 is disposed at a side of the circuit board 310 and has a bottom surface 322. When the connecting interface 312 of the expansion card 300 is inserted into the first slot 12, the first surface 332 of the supporter 330 leans against the bottom surface 322 of the heat-dissipating module 320 and the second surface 334 of the supporter 330 leans against the surface 16 of the motherboard 10 so that the bottom surface 322 of the heat-dissipating module 320 is substantially parallel to the surface 16 of the motherboard 10.

The difference of the expansion card 300 of the embodiment in FIG. 3 from the expansion card 200 of FIG. 2A rests in that the second surface 334 of the supporter 330 of the expansion card 300 directly contacts the surface 16 of the motherboard 10, while the second surface 234 of the supporter 230 of the expansion card 200 in FIG. 2A only leans against the second slot 14. In the embodiment, since the thickness of the heat-dissipating module 320 is smaller, when the connecting interface 312 is inserted into the first slot 12, no other slots are located under the heat-dissipating module 320. Therefore, the supporter 330 leans against between the bottom surface 322 of the heat-dissipating module 320 and the surface 16 of the motherboard 10 by design. The dimension of the supporter 330 and the position where the supporter 330 closely touches the bottom surface 322 of the heat-dissipating module 320 depend on the layout of the motherboard 10. For example, the supporter 330 can be disposed at a place other than the position of the capacitors on the motherboard 10.

The manufacturer can determine the required thickness of the supporter 330 according to the distance between the surface 16 and the bottom surface 322 when the connecting interface 312 is inserted into the first slot 12 and the first surface 332 of the supporter 330 is parallel to the surface 16 of the motherboard 10 and the deformation extent of the supporter 330 pressed down by the heat-dissipating module 320 so that the supporter 330 is able to support and hold the bottom surface 322 of the heat-dissipating module 320 to be parallel to the surface 16 of the motherboard 10. The material of the supporter 330 is nonconductive material, for example, rubber, which the invention is not limited to. In the embodiment, the expansion card 300 is a graphics card and the first slot 12 is a peripheral component interconnect express slot (PCI-E slot), however the types of the expansion card 300 and the first slot are not limited by the above-mentioned types.

Figure 4:
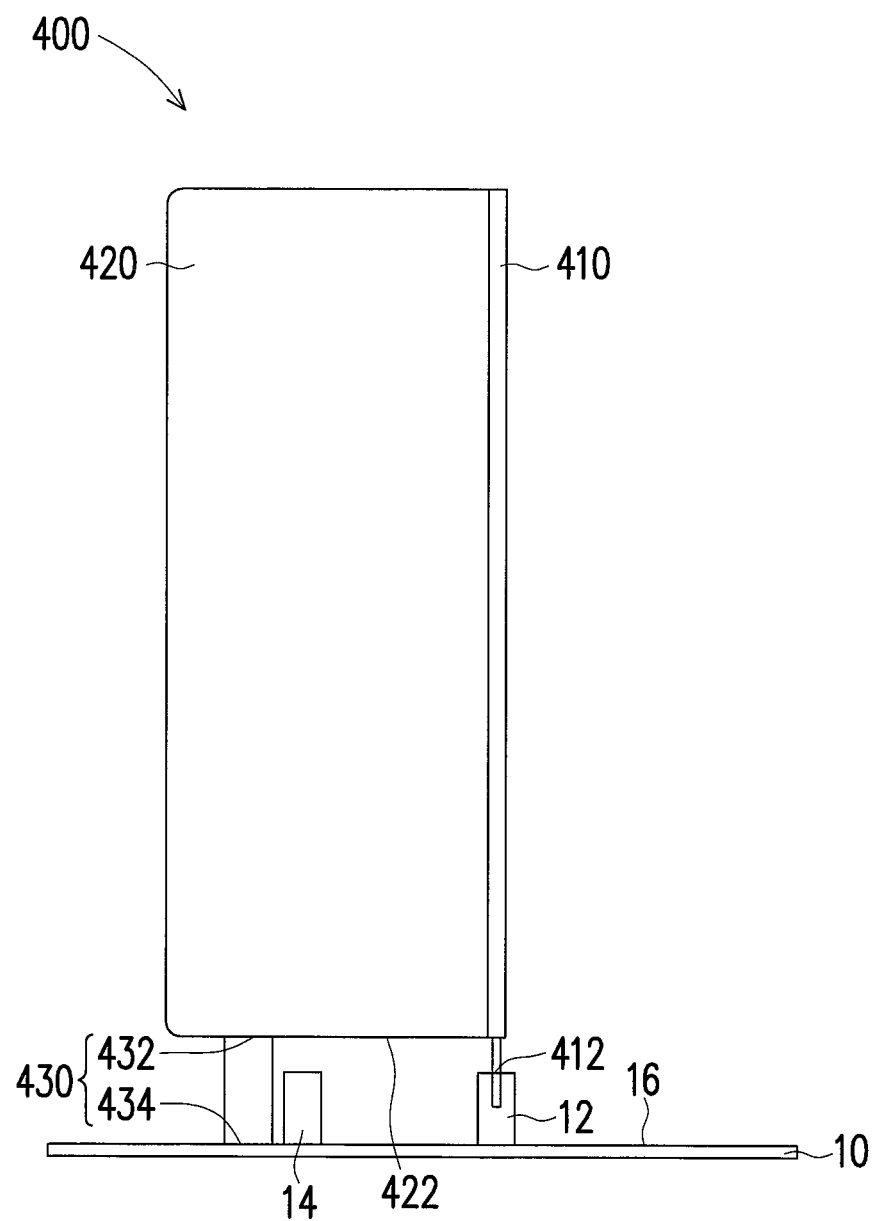
FIG. 4 is a schematic side-view diagram of an expansion card according to yet another embodiment of the invention.

FIG. 4 is a schematic side-view diagram of an expansion card according to yet another embodiment of the invention. Referring to FIG. 4, when the connecting interface 412 is inserted into the first slot 12, the heat-dissipating module 420 covers the second slot 14, that is to say, at the time; the second slot 14 is located under the heat-dissipating module 420. In the embodiment, the first surface 432 of the supporter 430 of the expansion card 400 in FIG. 4 leans against the bottom surface 422 of the heat-dissipating module 420 and the second surface 434 leans against the surface 16 of the motherboard 10. It should be noted that in the embodiment, the second surface 434 of the supporter 430 of the expansion card 400 is different from the design of FIG. 2A where the supporter 230 makes the second surface 234 lean against the second slot 14; instead, by any design able to support and hold the heat-dissipating module to make the bottom surface of the heat-dissipating module substantially parallel to the surface of the motherboard, no matter the second surface of the supporter leans against the second slot, the surface of the motherboard or other parts, the design is allowed and falls in the scope of the invention, and the position and the shape of the supporter is not limited by the above-mentioned design.

In summary, through a design of disposing a supporter at the bottom surface of the heat-dissipating module, when the connecting interface of the expansion card is inserted into the first slot, the heat-dissipating module can be risen up by the supporter so that the bottom surface of the heat-dissipating module is parallel to the surface of the motherboard to avoid the heat-dissipating module from overweight and inclination to bend the circuit board.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An expansion card, adapted for a motherboard, wherein the motherboard comprises a first slot and a second slot, the first slot and the second slot are located at a surface of the motherboard and the expansion card comprises:
   a circuit board, comprising a connecting interface configured for being inserted into the first slot of the motherboard;
   a heat-dissipating module, disposed at a side of the circuit board and having a bottom surface; and
   a supporter, different from the second slot;
   wherein when the connecting interface of the expansion card is inserted into the first slot, the heat-dissipating module covers the second slot, and the supporter is disposed at the bottom surface of the heat-dissipating module, a first surface of the supporter leans against the bottom surface of the heat-dissipating module and a second surface of the supporter leans against the surface of the motherboard, so that the bottom surface of the heat-dissipating module is substantially parallel to the surface of the motherboard.

2. The expansion card as claimed in claim 1, wherein when the connecting interface is inserted into the first slot, a first surface of the supporter leans against the bottom surface of the heat-dissipating module and a second surface of the supporter leans against the second slot.

3. The expansion card as claimed in claim 1, wherein length and width of the second surface of the supporter are respectively equal to or less than length and width of the second slot.

4. The expansion card as claimed in claim 1, wherein the expansion card is a graphics card, and both the first slot and the second slot are peripheral component interconnect express slots (PCI-E slots).

5. The expansion card as claimed in claim 1, wherein material of the supporter is nonconductive material.

6. The expansion card as claimed in claim 1, wherein the heat-dissipating module comprises a fan.

7. An expansion card, adapted for a motherboard, wherein the motherboard comprises a first slot and a second slot, the first slot and the second slot are located at a surface of the motherboard and the expansion card comprises:
- a circuit board, comprising a connecting interface configured for being inserted into the first slot of the motherboard;
- a heat-dissipating module, disposed at a side of the circuit board and having a bottom surface; and
- a supporter;
- wherein when the connecting interface of the expansion card is inserted into the first slot, the supporter is located between the first slot and the second slot, and a first surface of the supporter leans against the bottom surface of the heat-dissipating module and a second surface of the supporter leans against the surface of the motherboard so that the bottom surface of the heat-dissipating module is substantially parallel to the surface of the motherboard.

8. The expansion card as claimed in claim 7, wherein the expansion card is a graphics card and the first slot is a peripheral component interconnect express slot (PCI-E slot).

9. The expansion card as claimed in claim 7, wherein material of the supporter is nonconductive material.

10. The expansion card as claimed in claim 7, wherein the heat-dissipating module comprises a fan.

* * * * *